US006641055B1

(12) United States Patent
Tiernan

(10) Patent No.: US 6,641,055 B1
(45) Date of Patent: Nov. 4, 2003

(54) VARIATIONS ON COMBINED THERMOSTAT AND FUEL LEVEL MONITOR

(76) Inventor: Teresa Conaty Tiernan, 32 Gainer Ave., Centredale, RI (US) 02911

( * ) Notice: Subject to any disclaimer, the term of this patent is extended or adjusted under 35 U.S.C. 154(b) by 9 days.

(21) Appl. No.: 10/055,790

(22) Filed: Jan. 10, 2002

Related U.S. Application Data

(60) Provisional application No. 60/260,836, filed on Jan. 10, 2001.

(51) Int. Cl.[7] ........................ G05D 23/00; B65H 16/00
(52) U.S. Cl. ........................................ 236/94; 165/11.1
(58) Field of Search .................... 236/94, 46 A; 73/292; 165/11.1

(56) References Cited

U.S. PATENT DOCUMENTS

| 5,708,424 A | * | 1/1998 | Orlando et al. ........ 340/870.08 |
| 5,947,372 A | * | 9/1999 | Tiernan ........................ 236/94 |

* cited by examiner

*Primary Examiner*—William Wayner
(74) *Attorney, Agent, or Firm*—Bradley N Ruben

(57) ABSTRACT

Thermostats do not presently display the amount of stored heating fuel remaining. The replacement of a thermostat often requires the user to install a new backplate or goof plate because of the different size of the replacement thermostat. This invention provides a backplate or goof plate that displays the existing storage fuel level, and is for use with an existing or a replacement thermostat.

9 Claims, 1 Drawing Sheet

VARIATIONS ON COMBINED THERMOSTAT AND FUEL LEVEL MONITOR

This application is based on provisional application 60/260,836, filed Jan. 10, 2001, the disclosure of which is incorporated herein by reference.

This application provides variations on my prior U.S. Pat. No. 5,947,372, the disclosure and drawings of which are incorporated herein by reference in their entirety.

Briefly, that patent describes a thermostat that includes an associated device for measuring the level of a liquid heating fuel stored on or near the premises, such as heating oil or liquified natural or propane gas.

Figure 1:
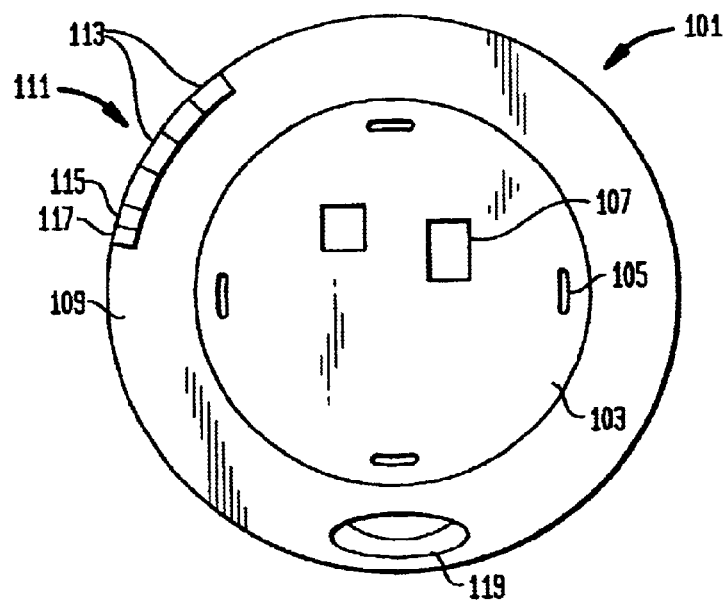

In one variation, shown in the attached FIG. 1, the level indicator is provided on a back plate of the thermostat, often termed a "goof" plate. Often a homeowner will change the type and/or style of thermostat installed, but the different (usually smaller) size of the new thermostat leaves exposed areas of the wall that are unfinished or damaged because of the presence of the old thermostat. A goof plate is typically sold as a cosmetic plate designed to covers those unsightly areas of the wall and does not provide functionality. In the present variations, the level indicator is provided on a goof plate so that the homeowner can simply add a goof plate to gain the benefits of the present invention instead of replacing the whole thermostat. As shown in FIG. 1, the goof plate 101 comprises a central mounting plate 103 which is attached to the wall behind the existing thermostat, which is attached on top of the mounting plate; the mounting plate typically includes a series of mounting holes 105 through which screws can be driven into the wall or into a junction-type box behind the mounting plate, as wells as working holes 107 through which process wiring to the thermostat is run from behind the wall. Around the mounting plate is typically a cosmetic flange 109. In this invention, the flange includes a level indicator 111 comprising a series of level lights 113, a warning flasher 115 as a low level alarm, and an emergency flasher 117 as a low-low level alarm. Also shown on the flange is a sound alarm 119 in the form of a buzzer or beeper. All of the lights are preferably LEDs. Although a circular goof plate has been shown, it can be made rectangular, oval, or in any cosmetically acceptable or desirable geometry.

Figure 2A:
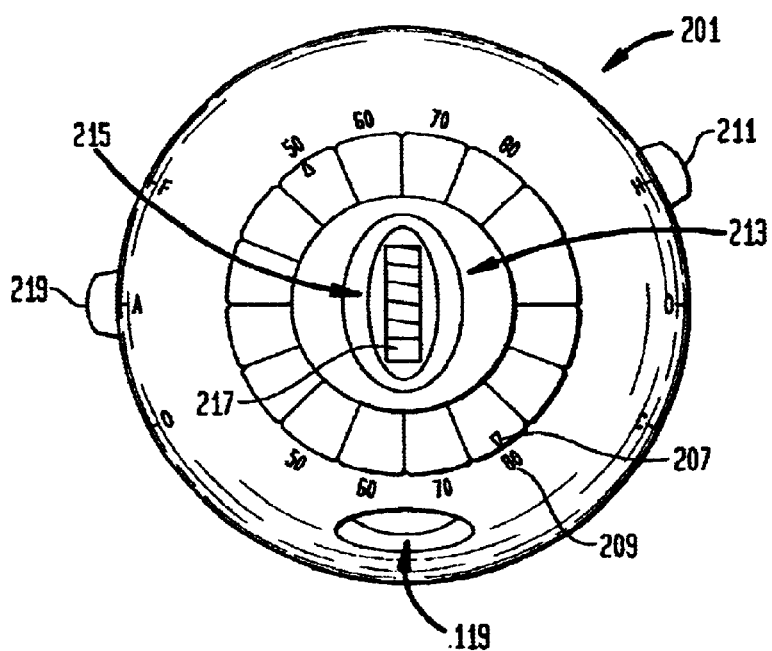
Figure 2B:
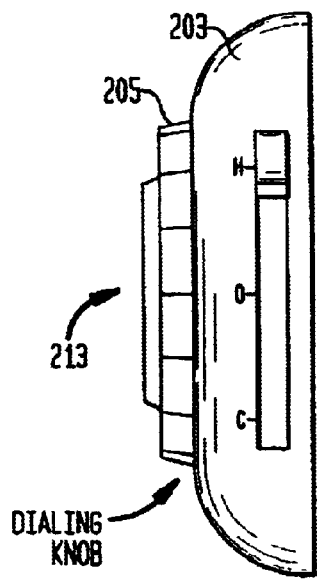

In another variation, FIGS. 2A and 2B show a conventional circular thermostat modified to have a level indicator. The thermostat 201 has an outer housing 203 in which the electronics are secured. On the face of the housing is a knob 205 for dialing the desired temperature, determined by a set point indicator 207 and temperature indications 209. The mode is set by a switch 211 moved between heating ("H"), cooling ("C"), and off ("O"); thus, the upper set of temperature indications is for the heating position and the lower set is for the cooling position. In the center of the housing is mounted the fuel level indicator 213. In this embodiment the indicator comprises a series of lights 215, preferably LEDs, that simulate a gauge. Below the series of lights is a warning light 217, and an optional low level warning light 219 can also be provided. As with the goof plate embodiment, an audio warning device 119 can be provided.

What is claimed is:

1. A back plate for a thermostat for controlling the temperature in a location heated by a liquid fuel, said back plate comprising means for indicating the level of liquid fuel remaining.

2. The back plate of claim 1, further comprising an audible alarm indicating a low level of fuel.

3. The back plate of claim 1, further comprising a warning light indicating a low fuel level.

4. The back plate of claim 1, wherein the series of lights is arranged so as to simulate a gauge.

5. The back plate of claim 1, wherein the plate has a geometry selected from circular, oval, and rectangular.

6. A combination thermostat and fuel level indicator comprising a housing in which the thermostat for a heating unit and the level indicator for the fuel used in said heating unit both reside, wherein the housing for the thermostat is circular or oval and the fuel level indicator comprises a series of lights mounted essentially central to the housing.

7. The combination set forth in claim 6, further comprising a warning light indicating a low fuel level.

8. The combination set forth in claim 6, further comprising an audible alarm indicating a low level of fuel.

9. The combination set forth in claim 6, wherein the series of lights is arranged so as to simulate a gauge.

* * * * *